United States Patent [19]

Watanabe et al.

[11] 3,962,969

[45] June 15, 1976

[54] INK MIST TYPE HIGH SPEED PRINTER

[75] Inventors: Akinori Watanabe; Katsuhide Tanoshima; Matsusaburo Noguchi, all of Tokyo, Japan

[73] Assignee: Oki Electric Industry Company, Ltd., Tokyo, Japan

[22] Filed: Nov. 22, 1974

[21] Appl. No.: 526,387

[30] Foreign Application Priority Data

Dec. 3, 1973 Japan ............................ 48-134408

[52] U.S. Cl. ............................ 101/1; 101/DIG. 13; 346/75

[51] Int. Cl.$^2$ ........................................ G01D 15/16

[58] Field of Search ................ 101/1, DIG. 13, 426; 197/1 R; 346/75

[56] References Cited

UNITED STATES PATENTS

| | | | |
|---|---|---|---|
| 2,577,894 | 12/1951 | Jacob | 346/75 |
| 2,676,868 | 4/1954 | Jacob | 346/75 |
| 3,177,800 | 4/1965 | Welsh | 101/1 |
| 3,273,496 | 9/1966 | Melmon | 101/DIG. 13 UX |
| 3,653,065 | 3/1972 | Brown | 101/DIG. 13 X |
| 3,769,627 | 10/1973 | Stone | 346/75 |
| 3,779,166 | 12/1973 | Pressman et al. | 101/426 |
| 3,832,719 | 8/1974 | Meier et al. | 346/75 |

*Primary Examiner*—Anton O. Oechsle
*Attorney, Agent, or Firm*—Lewis H. Eslinger; Alvin Sinderbrand

[57] ABSTRACT

A conductive protection board for protecting an aperture board from dust is mounted in an ink mist type high speed printer. The ink mist type printer operates on the principle that an ion stream modulated by an aperture board according to the pattern of the character to be printed, charges the ink mist, which is then attracted by an electric field to the surface of the paper. If an aperture of said aperture board is obstructed, a portion of the printed character will not be evident. In order to avoid the obstruction of an aperture the conductive protection board which has a plurality of apertures, each of which corresponds to each aperture of the aperture board, is placed very close to said aperture board.

3 Claims, 7 Drawing Figures

INK MIST TYPE HIGH SPEED PRINTER

BACKGROUND OF THE INVENTION

The present invention relates to an ink mist type high speed printer.

The operational speed of an information processing system including a computer system has recently been improved, thus requiring the use of a high speed peripheral device including a printer. A conventional high speed printer is a line printer with a type drum or a type train. However, this line printer has many disadvantages, some of which are that the operational speed is not sufficient for the latest information processing system, and the process involves a high level of noise and/or limitation of the number of printing types. In order to overcome these disadvantages of the prior line printer, some high speed printers with new operational principles have been developed. Among them, one of the most promising is an ink mist printer. The ink mist type printer operates at high speed, i.e. 8,000 lines per minute, with a low sound noise level. Further, it can type not only alphanumeric characters but also Chinese or Japanese characters.

The operational principle of an ink mist type printer is that an ion stream generated by corona discharge passes through apertures of an aperture board and ionizes an ink mist, and the movement of the electrically charged ink mist is accelerated by a negative electrode and is attached to paper according to the pattern of characters.

The disadvantage of the prior ink mist type printer was that dust obstructs apertures in the aperture board and prevents the passage of the ions. The obstructed apertures create incompletely printed characters and the source of the trouble cannot be located until the printing operation is actually completed, therefore wasting both paper and operational time.

Further, the dust created on the edges and/or perfurated holes of paper is apt to obstruct the abovementioned apertures.

SUMMARY OF THE INVENTION

The general purpose of the present invention is to provide an improved ink mist type printer with a facility for eliminating the obstruction of apertures by dust.

It is an object, therefore, of the present invention to overcome the disadvantages of the prior ink mist type printer by providing a protection board in an ink mist type printer. According to the present invention, a conductive protection board which has a plurality of apertures, each of which corresponds to each aperture of the aperture board, is inserted between the aperture board and the paper, very close to said aperture board, in order to prevent the dust from obstructing apertures in the aperture board.

BRIEF DESCRIPTION OF THE DRAWINGS

The foregoing and other objects, features, and attendant advantages of the present invention will be appreciated as they become better understood by references to the accompanying drawings wherein.

DETAILED DESCRIPTION OF THE PREFERRED EMBODIMENTS

First, the operational principle of an ink mist type printer will be explained to provide a basis for understanding of the present invention.

Figure 1:
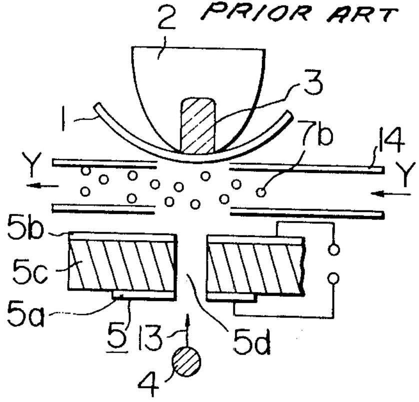
Fig. 1 PRIOR ART
FIG. 1 shows (the explanatory) sectional view of a conventional ink mist type printer.

FIG. 1 shows a basic structure of a prior ink mist type printer. The principle of typing in an ink mist type printer is to attach an ion stream to an ink mist which types or draws characters on printing medium such as a sheet of paper. Said ion stream is controlled by an electric field on an aperture board according to the pattern or shape of printed characters. In FIG. 1 an aperture board 5 is positioned between a positive electrode 4 and printing medium 1. The printing medium 1 is just ordinary paper. A negative electrode 3 is provided behind the printing medium 1 and doubles as a platen. The positive electrode 4 is a thin straight line made of tungsten. Several thousand volts applied to the positive electrode 4 generates a corona discharge and an ion stream 13.

Figure 3:
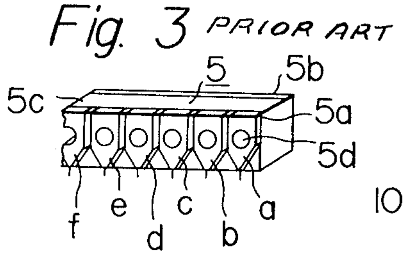
Fig. 3 PRIOR ART
FIG. 3 shows a perspective view of a conventional aperture board.

The strength of the electrical field required for corona discharge depends upon the shape of the positive electrode 4 and is generally 1000 – 1300 V/mm. The movement of the ion stream 13 generated on the positive electrode 4 is accelerated by the negative electrode 3 and passes through apertures **5*d* of the aperture board 5, the structure of which is shown in detail in FIG. 3, wherein reference number 5*c* is a dielectric layer, and 5*a* and 5*b* are conductive layers. The conductive layer 5*a*** is separated into a plurality of cells shown as *a, b, c, d,* . . . . . , and each cell *a, b, c,* . . . . . is insulated from the others. On the other hand the conductive layer **5*b*** is common to all cells *a, b, c,* .............. . A voltage E is applied to each cell of the conductive layers **5*a* and 5*b*, and the distribution of voltage E is related to the pattern or shape of the character to be printed. An electric field generated in the aperture by said voltage E prevents or accelerates the passage of the ion stream according to the polarity of the voltage E, therefore, the density of the ion stream which comes out of the aperture board 5** is modulated according to the pattern of the character. Voltage E is supplied by a character generator (not shown).

There is an ink mist between the aperture board 5 and printing medium 1. The ion stream 13 modulated by the aperture 5 attacks and charges the particles of the ink mist, then, the charged particles **7*b* of the ink mist are accelerated by the negative electrode 3 and attached to the surface of the printing medium 1.** Thus, the pattern of the character is printed on the printing medium in ink.

Figure 2:
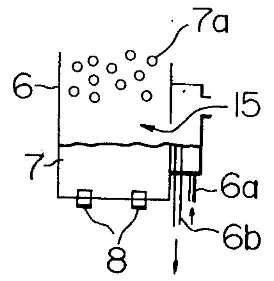
Fig. 2 PRIOR ART
FIG. 2 shows a sectional view of an ink mist generator in the conventional ink mist type printer.

FIG. 2 shows the structure of an ink mist generator, which comprises an ink tank 6 containing ink 7, an ink inlet **6*a*, an ink outlet 6*b*, and ultrasonic wave exciters 8. The depth of the ink 7 in the ink tank 6 is maintained automatically at a desirable depth by the ink stream through the inlet 6*a* and the outlet 6*b*. The exciters 8 generate ultrasonic waves and generate ink mist 7*a*, the diameter of which is 5 – 20 $\mu$. The ink mist 7*a* is transported by an air stream 15 to an ink guide 14 (FIG. 1), and directed along arrow Y in the same direction as the movement of the paper 1**. The moving speed of the ink mist *7a* is almost the same as that of the paper 1. The ink mist which is not used for printing is gathered and condensed in a tank (not shown).

One problem of a conventional ink mist type printer is, as explained before, that apertures of the aperture board are sometimes obstructed by the dust forming on paper 1, thus obscuring portions of the printed character.

Figure 4:
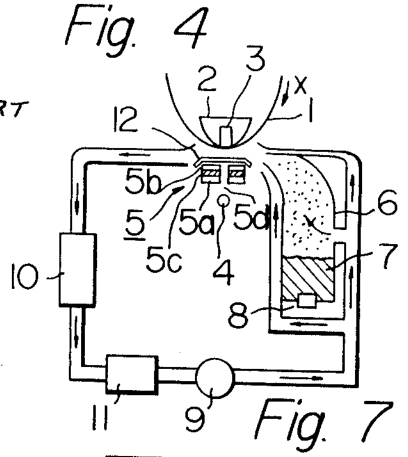
FIG. 4 shows a sectional view of an ink mist type printer according to the present invention.
Figure 5:
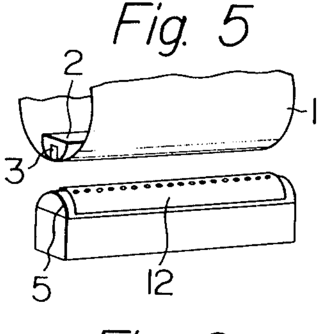
FIG. 5 and FIG. 6 are enlarged views of a protection board 12 in FIG. 4.
Figure 6:
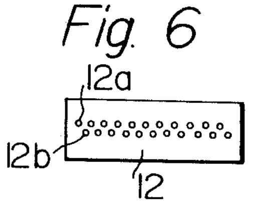

FIG. 4 is a simplified view showing the sectional view of the main printing part of the ink mist type high speed printer, according to the present invention. In FIG. 4 numeral number 1 indicates a recording paper running in the direction indicated by an arrow X, numeral 2 is a platen disposed on the back of the recording paper 1 and installed with a negative electrode 3, numeral 4 is a positive electrode composed of a thin wire made of tungsten, numeral 5 is an aperture board including a selection electrode *5a*, a common electrode *5b* and an insulating member *5c* interposed between the two electrodes and having a plurality of penetrating apertures *5d* aligned in the lengthwise direction thereof, numeral 6 is a mist tank for vibrating and atomizing an ink solution 7 by applying an electric pulse to an ultrasonic exciter 8 composed of a piezo-electric material, numeral 9 is a main pump for feeding air to the mist tank 6, numeral 10 is a condenser for separating the ink from air recovered from the printing zone, and numeral 11 is a cooler. Numeral 12 denotes an electrically conductive protection board disposed close to the aperture board 5 as shown in FIG. 5 and FIG. 6. A plurality of apertures 12*a*, 12*b*, . . . . . are perforated through the electrically conductive protection board 12 at positions corresponding to ion-passing apertures of the aperture board 5. In order to facilitate passage of ions through these apertures 12*a*, 12*b*, . . . . . , it is necessary to apply a voltage adjusted appropriately depending on the position at which the electrically conductive protection board 12 is disposed. Ions for causing ink particles to stick on the recording paper 1 are modulated by the aperture board 5. More specifically, movement of the ions is prevented or accelerated depending on the polarity of the selection electrode *5a* of the aperture board, namely whether the selection electrode *5a* is positive or negative to the common electrode *5b*.

Since the surface of the recording paper 1 is readily electrostatically charged, various dust particles differing in the size are likely to accumulate thereon. This dust falls on the aperture board 5 from the recording paper 1 due to laminar flows of air in the printing zone. Further, when the recording paper 1 is broken or movement of the recording paper 1 is interrupted during the printing operation, the ink adheres on one particular portion of the platen 2 or recording paper 1, so that the ink is accumulated in a mountain-like form at said portion and falls upon the aperture board 5 due to its own weight.

In the apparatus of this invention, since the electrically conductive protection board 12 is disposed above the aperture board 5, dusts and ink are collected on said protection board 12 and they are prevented from reaching the aperture board. Accordingly, the aperture board 5 can be kept continuously free of dust merely by cleaning the electrically conductive protection board 12 at an appropriate time or replacing it by a fresh protection board. As a result, in the apparatus of this invention, inhibition of the movement of ions by jamming of penetrating apertures 5d of the aperture board 5 can be effectively prevented.

The aperture board 5 is actually composed of a thin dielectric sheet and printed conductive layers (selection electrode *5a* and common electrode *5b*).

Figure 7:
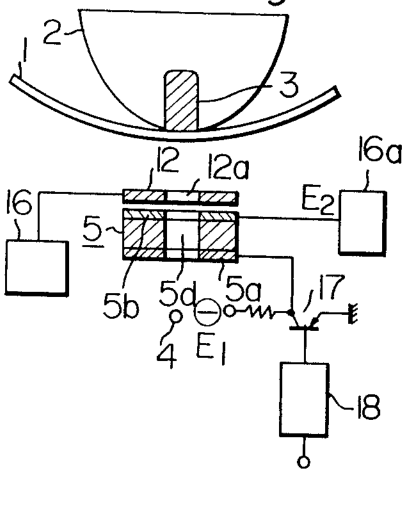
FIG. 7 shows a brief circuit diagram concerning a protection board according to the present invention.

FIG. 7 shows a brief circuit diagram concerning a conductive protection board 12. In FIG. 7, the same reference numbers refer to the same members as those of FIG. 4. A conductive protection board 12 is inserted between the aperture board 5 and the paper 1, close to said aperture board 5. Each aperture of the aperture board 5 corresponds to each aperture of the conductive protection board 12, therefore, an ion stream generated by the positive electrode 4 can pass through the aperture *5d* of the aperture board 5 and the aperture 12*a* of the conductive protection board 12. The conductive protection board 12 is connected electrically to the Direct Current source 16 and supplied with the desired voltage. On the other hand, each cell of the separated conductive layer *5a* is connected to an output of a drive circuit 17, the input of which is connected to the output of a selection circuit 18. The selection circuit 18 selects the cells to which high voltage $E_1$ is applied according to the pattern to be printed. Since there are a plurality of cells on the layer *5a*, a plurality of drive circuits 17, must be provided. However, only one representative drive circuit 17 is shown. The common layer *5b* is electrically connected to the other D.C. source 16a.

As is apparent from the above explanation, an improved ink mist type high speed printer which prevents the obstruction of the apertures of the aperture board and thus facilitates the maintenance of the printer.

Another effect of the present invention is that there is a reduction in the wastage of printing paper.

It can be seen that the present invention provides a simple and unique ink mist type printer and although it has been described with respect to embodiments, it need not be so limited, as changes and modifications may be made which would fall within the scope of the invention as defined by the appendant claims.

Finally, reference numbers used in this specification are listed below.

| | | | |
|---|---|---|---|
| 1; | printing medium | 2; | platen |
| 3; | negative electrode | 4; | positive electrode |
| 5; | aperture board | 6; | mist tank |
| 7; | ink | 8; | exciter |
| 9; | main pump | 10; | condenser |
| 11; | cooler | 12; | conductive protection board |
| 13; | ion stream | 14; | ink guide |
| 15; | air stream | 16; | D.C. source |
| 17; | drive circuit | 18; | selection circuit |

What is claimed:

1. In an ink mist type printer for use in printing information on a printing medium, which printer includes means for generating an ion stream comprising a pair of spaced upper and lower electrodes to which a high voltage is applied, means positioned between said electrodes for modulating said ion stream including an electrically controlled aperture board having a plurality of apertures therein, said apertures being positioned in at least one aligned row through which the ion stream passes and is modulated, means for supplying an ink mist between the aperture board and the upper of said electrodes whereby the modulated ion stream charges the mist according to the pattern to be printed on a printing medium arranged parallel to the flow of said ink mist and between said upper electrode and the aperture board whereby characters are printed on said medium by the attraction to said upper electrode of the charged ink mist; the improvement which comprises a conductive dust protection board positioned above said aperture board and below said printing medium, said protection board having a plurality of apertures formed therein corresponding to and located in alignment with said apertures of said aperture board, thereby to prevent dust particles from falling downwardly from the printing medium onto said aperture board.

2. An ink mist type printer according to claim 1, wherein the upper surface of the aperture board is curved and said conductive protection board has a complementary curve.

3. An ink mist type printer according to Claim 1 including means for applying D.C. voltage to said conductive protection board.

* * * * *